Oct. 19, 1948.   T. J. LEHANE ET AL   2,451,566
AUTOMATIC PANEL CIRCUIT FOR AIR REHEAT CONTROL
Filed April 16, 1945   2 Sheets-Sheet 1
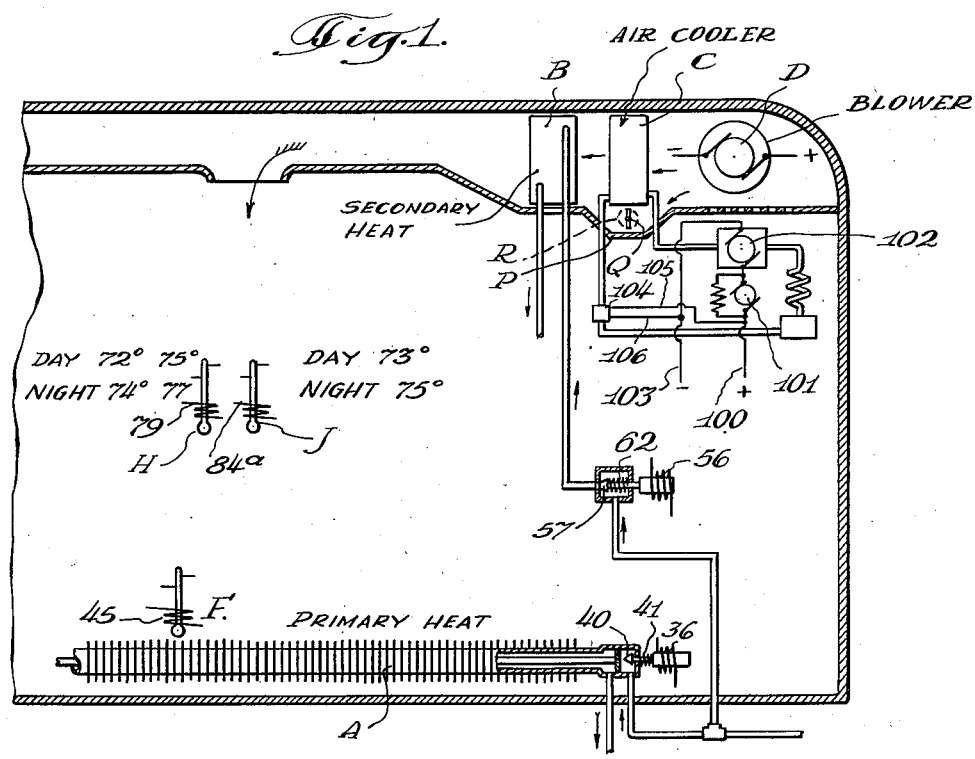
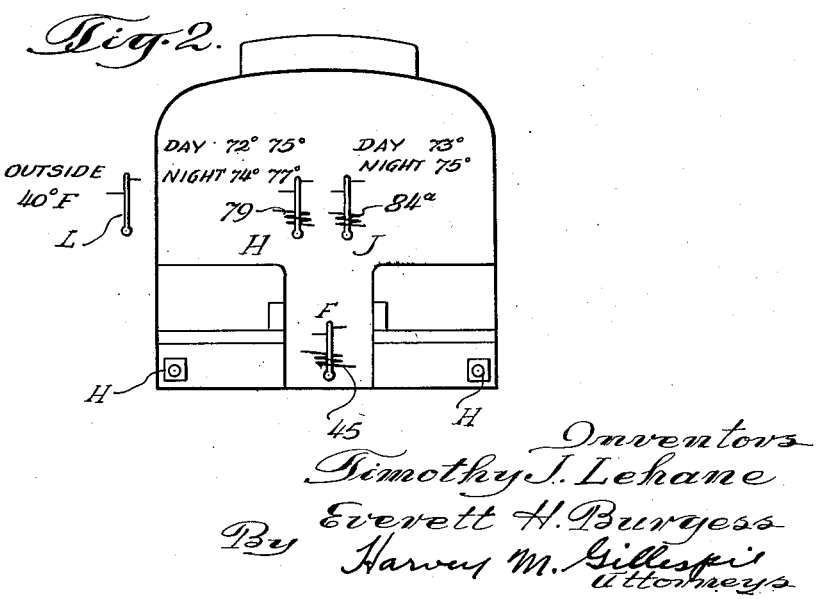
Inventors
Timothy J. Lehane
Everett H. Burgess
By Harvey M. Gillespie
Attorneys

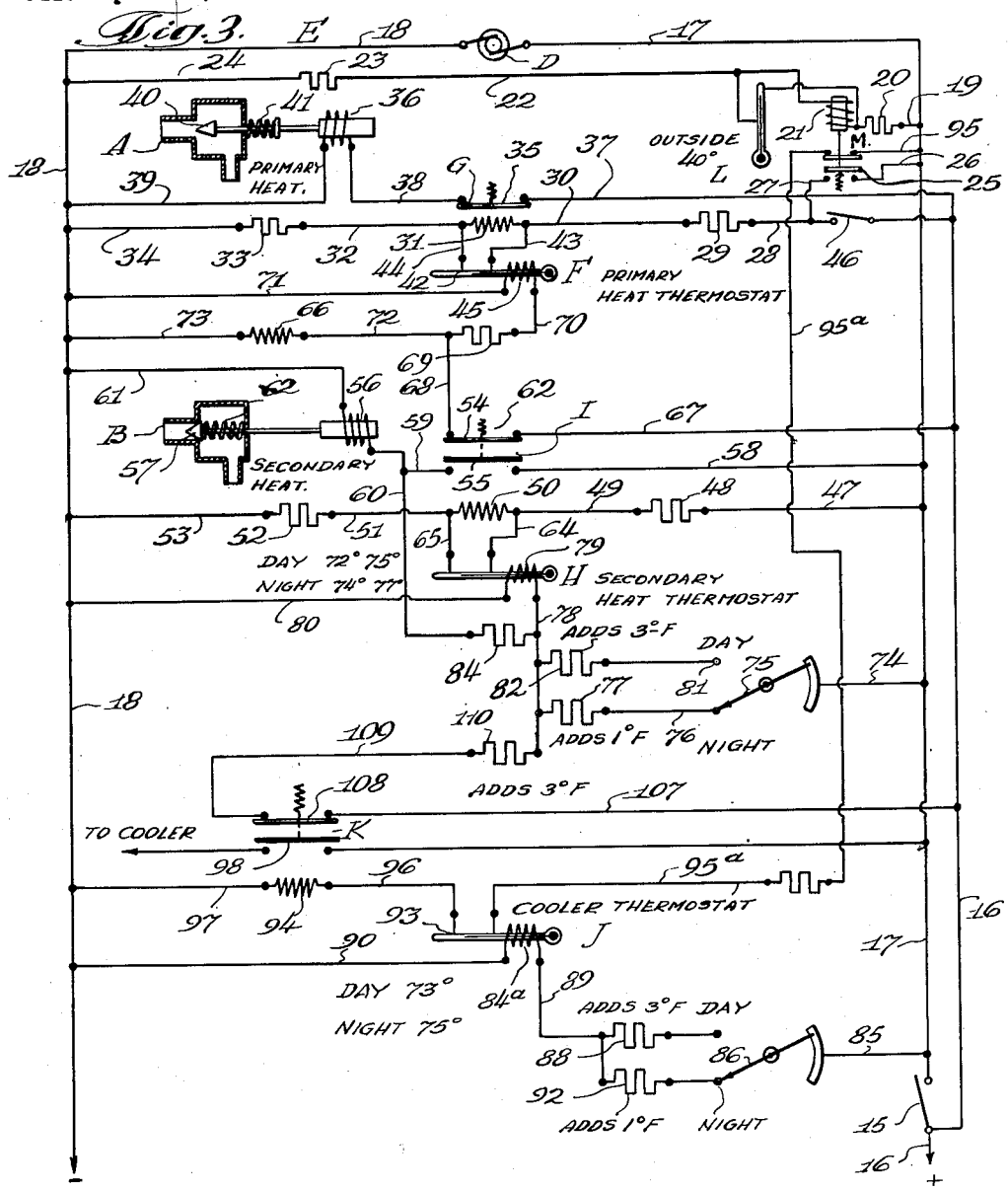

Patented Oct. 19, 1948

2,451,566

UNITED STATES PATENT OFFICE 2,451,566

AUTOMATIC PANEL CIRCUIT FOR AIR REHEAT CONTROL

Timothy J. Lehane and Everett H. Burgess, Chicago, Ill., assignors, by mesne assignments, to Vapor Heating Corporation, a corporation of Delaware Application April 16, 1945, Serial No. 588,609

14 Claims. (Cl. 257—3)

This invention relates to improvements in apparatus for controlling the operation of means for heating and/or cooling an enclosed space to maintain a desired temperature therein.

The improvements herein shown and described are directed specifically to apparatus suitable for controlling the temperature of a railway passenger coach, but it will be obvious to persons familiar with the art that the said improvements may be advantageously used in many other situations.

A principal object of the invention is to provide a control apparatus which will function in an improved manner to control the operation of a heating element and a cooling element, whereby either may be made ineffective during the operation of the other and whereby, under certain conditions, both heating and cooling elements may be operated simultaneously and in cooperation with each other to maintain the desired temperature within an enclosed space.

Another object is to provide in control apparatus of the above character a primary and a secondary heating system which, under certain conditions, will operate conjointly and in which one of said systems is rendered ineffective upon the rise of the outside temperature to a predetermined point.

Another object is to provide in apparatus of the above character thermostats which are set to function at predetermined temperatures to control the operations of elements for heating and cooling air circulated through the space and to provide means associated with said thermostats and adapted, upon the functioning of the cooling element thermostat, to adjust the heating element thermostat to raise its functioning temperature, whereby the air cooled by said cooling element will be reheated by said heating element.

Another object is to provide, in combination with heating and cooling elements and means for forcing air through said elements, means operative in harmony with the heating and cooling demands of the temperature controlled space to by-pass a portion of the air around one of said elements and thereby vary the effectiveness of said element.

According to the present invention, primary and secondary means are employed to heat air circulated through an enclosed space. The operation of the heating and cooling elements are controlled by means responsive to temperature changes within the space being controlled. Under certain conditions the heating and the cooling elements may be operated conjointly to cool and thereafter heat the air, or they may be made separately ineffective, depending upon the temperature requirements of the space whose temperature is being controlled. If it should be also desirable to control the temperature of the space in relation to a desired relative humidity and temperature, combined wet-dry thermostats may be substituted for one or more of the dry bulb thermostats herein shown.

The invention will be better understood by considering the following disclosure in connection with the accompanying drawings and its scope will be pointed out in the appended claims.

In the drawings:

Fig. 1 is a fragmentary sectional view of a railway coach showing one preferred arrangement of the heating and cooling elements together with the control thermostats and other related devices.

Fig. 2 is a cross-sectional view of the coach on a smaller scale; and

Fig. 3 is a wiring diagram illustrating the various circuits and electrically actuated devices for controlling the operations of the heating and cooling elements.

The invention may be described briefly as including a primary heating element A, a secondary heating element B, an air cooling element C, a blower D for forcing air through elements B and C and an electric control apparatus E.

The primary heating element, or elements as the case may be, are in the form of radiators located near the floor of the enclosed space and function to add heat directly to the atmosphere within the space. The secondary heater is preferably arranged overhead and delivers preheated air into the said space from a duct. The air cooler is arranged so that, during the cooling function of the system the air is forced by a blower through the cooling apparatus C. If the weather is mild so that it is desired to reheat the air, all or part of the air may be directed through the cooler C and thereafter through secondary heater B, so as to reheat the air to the desired temperature before it is delivered into the enclosed space.

The electric control apparatus includes a primary heater thermostat F responsive to temperature changes in the room and its cooperating relay G for controlling the supply of heating medium, for example steam, to the floor radiator; a similar thermostat H, responsive to temperature changes in the car, and its associated relay I for controlling the supply of heating medium to the secondary radiator, and a thermostat J and cooperating relay K for controlling the operation of the air cooling apparatus C, which apparatus is shown diagrammatically in Fig. 1 of the drawings. An outside thermostat L and its associated relay M are connected in the electric circuits and serve to make the primary heaters and the controls therefor ineffective when the outside temperature rises to a predetermined minimum, for example 40° F. In addition to the above elements the invention includes various resistors and auxiliary electric heaters for adjusting the functional settings of the thermostats to accelerate or retard the operations of the thermostats in relation to each other. In order to alter the effectiveness of the heating and cooling elements B and C, particularly the cooling element C, a means is provided for varying the air flow through the cooling element and thereby vary the effectiveness of the cooling and heating elements in accordance with the heating and cooling demands of the enclosed space. The invention includes, in this connection, a by-pass duct P, a valve Q located in the by-pass duct, and a heat motor R controlled by the temperature of the space for varying the position of the valve.

Referring now to the control circuits shown in Fig. 3: All operating parts of the wiring diagram are shown in the positions which they assume when the passenger coach is out of service. When the coach is put into service a manually operated switch 15 is closed. The closing of this switch establishes an electric circuit leading from the positive line 16 through the switch arm 15, wire 17, the blower operating motor D, and thence to the negative line 18. This circuit energizes the blower motor so that the blower will force air through the cooling element C and the heating element B. Simultaneously with the closing of the energizing circuit for the blower motor a second circuit is established leading from the positive wire 17 through wire 19, resistor 20, solenoid 21 of relay M, thence through wire 22, resistor 23 and wire 24 to the negative line 18. This circuit energizes said relay M so as to close its movable contact 25 and thereby close a circuit through the actuating solenoid of relay G. This circuit leads from positive wire 17, through wire 26, movable contact 25 of relay M, wires 27 and 28, through resistor 29, wire 30, solenoid coil 31 of relay G, thence through wire 32, resistor 33, and wire 34 to the negative line 18. The closing of this circuit energizes the solenoid 31 so as to open the movable contact 35 of relay G and thereby open the energizing circuit through solenoid 36. The solenoid 36 is normally energized by a circuit consisting of wire 37 leading from the positive line 16 through the movable contact 35 of relay G, wire 38, solenoid coil 36, thence through wire 39 the negative line 18. When this circuit is effective the valve 40 is closed, but when the circuit is broken, the valve 40 is held open by a spring 41. Consequently, when the solenoid 31 of relay G is energized to move the contact 35 to its open position, the valve actuating solenoid 36 is deenergized and permits the valve to open to supply steam to the primary radiators A. This operation will continue until the mercury column of thermostat F engages the outer contact 42 thereof. The closing of the thermostat at the said contact by-passes the electric current around the solenoid 31 through wire 43, mercury column of thermostat F and wire 44 so as to deenergize the said solenoid 31. This condition permits the contact 35 to close the energizing circuit through valve solenoid 36 and thereby shuts off the supply of steam to the primary radiators A. Each time that the mercury column of said thermostat F drops below the outer contact 42, the relay G is actuated to deenergize the solenoid 36 and permits spring 41 to open the radiator valve 40. The said valve 40 may remain open for a substantial period or for only a brief period depending upon the cooperative functioning of the thermostat H and relay I to supply electric current to an auxiliary heater 45 in the manner hereinafter described.

If it should be desirable to open the supply valve 40 to deliver steam to the primary radiators when either the switch 15 or the contact 25 of relay M are open, the relay G can be energized to break the circuit through the valve solenoid 36 by closing a manually operated switch 46 so as to direct current from the positive line 16 to the solenoid of relay G.

Simultaneously with the opening of the valve 40 to supply steam to the primary radiators, a valve 57 is opened to supply steam to the secondary radiator B. This is accomplished by means of a circut leading from the positive wire 17, through wire 47, resistor 48, wire 49, solenoid 50, wire 51, resistor 52, and thence through wire 53 to the negative line 18. The energization of solenoid 50 operates relay I to open its contact 54 and close its contact 55. The latter of which establishes an energizing circuit through solenoid 56 for opening said steam supply valve 57 for the secondary radiator B. This energizing circuit leads from positive wire 17 through wire 58, closed movable contact 55 of relay I, wires 59 and 60, through solenoid 56, and thence through wire 61 to the negative line 18. The supply valve 57 for the radiator B will be held open against the compression of spring 62 until the mercury column of thermostat H engages the outer contact 63 thereof. When this occurs the current is by-passed around the relay solenoid 50 through wire 64, mercury column of thermostat H and wire 65 to the negative side of the said solenoid 50. This releases the relay contact 55 to open the energizing circuit through the valve solenoid 56 and thereby permits the supply valve 57 to close and also releases relay contact 54 so that it moves into a position to close an energizing circuit through the auxiliary heater 45 of primary heater thermostat F and through a heating coil 66 of a heat motor R. The heat motor operates the valve Q to by-pass a portion of the air around the cooling element C and thereby varies the effectiveness of said cooling element to meet the temperature demands within the enclosed space. For example, when the temperature of the enclosed space is such as to require full capacity of the cooling element, the heat motor R will operate to move valve Q to close the by-pass P and thereby direct all of the air through the cooling element. The energizing circuit through the said auxiliary heater 45 leads from the positive line 16 through wire 67, movable contact 54 of relay I, wire 68, resistor 69, and wire 70 to the said auxiliary heater 45 and thence through wire 71 to the negative line 18. A portion of the electric current is directed through the heating coil 66 of said heat motor R. This branch of the circuit leads from wire 68 through wire 72, heat motor coil 66 and thence through wire 73 to the negative line 18. It will be noted here that the auxiliary heater 45 for the thermostat F and the heating coil 66 of the heat motor are effective only when the secondary radiator thermostat H is satisfied and the steam supply is shut off from the secondary radiator B. Consequently, when the secondary radiator thermostat H is satisfied and the relay I is moved by spring 62 to the position indicated in full lines in Fig. 3, the auxiliary heater 45 is energized to supply added heat to the primary heater thermostat F and thereby cause its mercury column to engage its outer contact 42 and thereby actuate relay G to energize valve solenoid 36 so as to close the supply valve 40. This cycling action of the primary radiator thermostat takes place each time that the supply valve 57 for the secondary radiator is opened and closed.

The thermostat H for controlling the secondary radiator is positioned at a suitable location in the car to respond to the temperature changes therein. It is constructed to normally function at a predetermined temperature, for example 78° F., but this original setting is preferably adjusted by the application of auxiliary heat to the thermostat so that it will function at a lower room temperature. Preferably the amount of auxiliary heat is varied so that the thermostat will function at a day room temperature of 72° F. and at a night room temperature of 74° F. when the cooling apparatus is not operating. However, when the cooling apparatus is operating, the functional setting of said thermostat H is automatically raised to 75° F. and 77° F., respectively, so that the heating thermostat H will have a room temperature setting 2° F. higher than the room temperature setting of the cooling control thermostat T.

The auxiliary heat is applied to thermostat H by means of an electric circuit leading through positive wire 17, through wire 74 to a manually operated two-position switch 75 when the switch is in the position illustrated in full lines in Fig. 3, electric current passed from the switch through wire 76 and resistor 77 to wire 78, auxiliary heater 79, thence through wire 80 to the negative line 18. The resistor 77 is so proportioned as to supply sufficient current to the auxiliary heater 79 to add 3° F. to the thermostat H, and consequently, in the absence of other auxiliary heating current, the thermostat H will function when the temperature of the space reaches 75° F. When the switch 75 is moved to its other position, the current is directed from the switch 75 through wire 81 and resistor 82 to said wire 78, and thence through the auxiliary heater 79 of thermostat H and wire 80 to the negative line 18. The said resistor 82 preferably permits a smaller amount of current to pass to the auxiliary heater 79, for example 1°, so that the thermostat H, when set for night control and in the absence of other auxiliary heating current, will function at a higher room temperature, for example 77° F.

When the solenoid 50 of the relay I is energized to close the movable contact 55 and thereby establish an energizing circuit through solenoid 56 to open the steam supply valve to the secondary radiator, the closing of said relay contact 55 establishes a circuit for adding additional heat to the auxiliary heater 79 of the thermostat H. This heating circuit is intended merely to accelerate the functioning of thermostat H and leads from positive line 17, through wire 58, movable contact 55 of relay I, wire 83, cycle resistor 84 to wire 78 and thence through the auxiliary heater 79 and wire 80 to the negative line 18. This additional heat supplied to the thermostat H is removed as soon as the mercury column of the thermostat engages the outer contact 63 whereupon the mercury column immediately recedes from said contact 63 and thereby brings about a cycling action which opens and closes the steam supply valve to introduce momentary bursts of steam into the secondary radiators until the temperature of the enclosed space is sufficient to maintain the mercury column of thermostat H in engagement with its outer contact 63. When the cooling apparatus is not functioning, an additional heating circuit of 3° F. is supplied through wire 107, contact 108 of relay K, wire 109, resistor 110, and wire 78 to heater 79, thence through wire 80 to negative line 18. It will be seen, therefore, that when the cooling apparatus is not functioning, the auxiliary heating current supplied through resistors 82 and 110 will adjust the thermostat to a room temperature setting of 72°. It will be observed also that the night setting will be 74°, since the resistor 77 in the night heater circuit adds only 1° of heat to the thermostat.

*Cooling control*

The operations of the cooling element C are controlled by a relay K whose operations are controlled by the thermostat J. This thermostat is preferably arranged within the enclosed space whose temperature is being controlled so as to respond to changes in the temperature. It is also connected through the relay M so that it will not be effective until the outside temperature rises above 40° F. The thermostat is manufactured to function at a temperature of 76° F., but this is adjusted to a lower room temperature by auxiliary heating circuits whereby the functioning temperature of the thermostat may be raised or lowered to suit day or night occupancy. One of these circuits includes wire 85 and switch 86, wire 87, resistor 88, wire 89 through the auxiliary heater 84a and thence through wire 90 to the negative line 18. The resistor 88 preferably supplies 3° of auxiliary heat to the thermostat J so that it will function at a room temperature of 73°. When the said switch 86 is in the position shown in Fig. 3, a resistor 92 controls the amount of electric current supplied to the auxiliary heater 84a. Inasmuch as the resistor 92 adds only 1° of auxiliary heat, the thermostat J will function at a night room temperature of 75°. When the temperature at the thermostat J is such as to cause its mercury column to engage its outer contact 93, the solenoid 94 of relay K is energized to actuate the relay K. This energizing circuit leads from positive line 17 through wire 95, relay M, wire 95a, mercury column of thermostat J, outer contact 93 of said thermostat, thence through wire 96, solenoid 94 and wire 97 to the negative line 18. The energization of solenoid 94 moves contact 98 to close an energizing circuit to start the cooler element C operating. This circuit leads from positive line 17 through wire 99, movable contact 98 of relay K, wire 100 through a condenser fan 101, a compressor 102, thence through wire 103 to the negative line 18. Simultaneously with the energization of the cooler mechanism, a circuit is established to open valve 104 in the coolant circulating system associated with the cooler C. This valve opening circuit leads from positive wire 100 through wire 105, valve 104, and wire 106 back to the negative wire 103. It will be here observed, as previously described, that the relay K, when enerized to start operation of the cooling apparatus, opens the circuit through resistor 110 and thereby removes 3° of auxiliary heat from thermostat H. This automatically raises the functional setting of thermostat H so as to induce operation of the secondary heaters during the cooling operation until the temperature of the enclosed space has changed sufficiently to make it undesirable to add heat to the cooled air introduced into the space.

*Summary of operation*

By inspection of Fig. 3 of the drawings it will be apparent that the closing of switch 15 will energize the blower fan D so that this element will force air through the heating element B and cooling element C. When the outside temperature, as measured by thermostat L, is below 40° F., the relay M is actuated to close its contact 25, thereby making it possible to energize relay G. When the outside temperature rises above 40°, the relay M closes its upper contact so as to make effective the cooling control thermostat J. The energization of the relay G operates to deenergize valve actuating solenoid 36 so as to permit the valve 40 to open and thereby supply steam to the primary radiators A. The opening and closing of the valve 40 is under the control of thermostat F and said relay G until the outside temperature rises above 40° F. When this occurs, the thermostat L closes a circuit which deenergizes relay M and thereby opens the circuit through solenoid 31 of relay G, bringing about the closing of steam supply valve 40. Simultaneously with the supply of steam to the primary radiators A, the relay I is actuated to close an energizing circuit through valve solenoid 56 to open the valve 57 and thereby supply steam to the secondary radiator B. The said valve 57 is under the control of thermostat H. The functional setting of the thermostat H is in part controlled by electric heating circuit closed through relay K. Consequently, when the cooling element C is not operating and the relay K is in the position indicated in Fig. 3, the auxiliary heater 79 of thermostat H is supplied with additional current through a circuit leading from positive line 16 through wire 107, movable contact 108 of relay K, wire 109 and resistor 110 to wire 78, and thence through the auxiliary heater 79 and wire 80 to the negative line 18. It will be seen, therefore, that when the outside temperature is such that the relay M makes thermostat J effective and when the functioning of thermostat J actuates the relay K to close a circuit through the operating mechanism of the cooling element C, the resistor circuit 110 is removed from the heating circuit of auxiliary heater 79 and thereby raises the functional setting of secondary heater thermostat H so that the secondary heater will not function to add heat to the cooled air until the temperature of the enclosed space is heated sufficiently to close the circuit through thermostat H.

We claim:

1. In combination with heating means for directly adding heat to the air within an enclosed space, means for circulating air through the space and heating means for heating the circulated air; a thermostat responsive to temperature changes within the space for controlling the first mentioned heating means, an auxiliary electric heater for said thermostat, a second thermostat responsive to temperature changes within the space for controlling means for heating the circulated air, means effective upon the functioning of the last mentioned thermostat for closing an energizing circuit through said auxiliary heater, and an auxiliary heater for the second thermostat, and means including a third thermostat responsive to a predetermined space temperature for opening a circuit through the second mentioned auxiliary heater and thereby adjust the second mentioned thermostat to a higher functional setting.

2. In combination with heating means for directly adding heat to the air within an enclosed space, means for circulating air through the space and heating means for heating the circulated air; a thermostat responsive to temperature changes within the space for controlling the first mentioned heating means, an auxiliary electric heater for said thermostat, a second thermostat responsive to temperature changes within the space for controlling means for heating the circulated air, an auxiliary electric heater for the second thermostat, a relay controlled by the second thermostat adapted in one position to close an energizing circuit through the auxiliary heater of the first mentioned thermostat and in another position to close an energizing circuit through the auxiliary heater of the second thermostat, and means including a third thermostat responsive to the temperature of the enclosed space for opening a circuit through the auxiliary heater for the second thermostat and thereby adjust the second thermostat to a higher functional setting.

3. In combination with heating means for directly adding heat to the air within an enclosed space, means for circulating air through the space and heating means for heating the circulated air; a thermostat responsive to temperature changes within the space for controlling the first mentioned heating means, an auxiliary electric heater for said thermostat, a second thermostat responsive to temperature changes within said space, an auxiliary electric heater for the second thermostat, a relay controlled by the second thermostat adapted to close an energizing circuit through the auxiliary heater of the first mentioned thermostat when the second thermostat is satisfied and is effective to close an energizing circuit through the auxiliary heater of the second thermostat when the second thermostat calls for heat, and means including a third thermostat responsive to the temperature of the enclosed space for opening a circuit through the auxiliary heater for the second thermostat and thereby adjust the second thermostat to a higher functional setting.

4. In combination with a primary heater for directly adding heat to an enclosed space, means for circulating air through the space, and a secondary heater for adding heat to the circulated air; means for controlling the operation of the primary heater including a normally open valve for supplying heating medium thereto, an electrically energized device for closing said valve, a relay for closing a circuit through said device, and a thermostat responsive to temperature changes in the space for controlling the operation of said relay; means for controlling the operation of the secondary heater including a normally closed valve for supplying heating medium thereto, a solenoid for opening the said normally closed valve, a relay for closing a circuit through the solenoid and a thermostat responsive to temperature changes for controlling the operation of this relay; separate auxiliary electric heaters for said thermostats and energizing circuits therefor connected through the last mentioned relay, whereby auxiliary heat is added to the first mentioned thermostat when the supply valve for the secondary heater is closed and auxiliary heat is added to the last mentioned thermostat when the said supply valve for the secondary heater is open; and means including a third thermostat responsive to a predetermined temperature of the enclosed space for opening a circuit through the auxiliary heater for the second thermostat and thereby adjust the second thermostat to a higher functional setting.

5. In combination with a primary heater for directly adding heat to an enclosed space, means for circulating air through the space, and a secondary heater for adding heat to the circulated air; means for controlling the operation of the primary heater including a normally open valve for supplying heating medium thereto, an electrically energized device for closing said valve, a relay for closing a circuit through said device, and a thermostat responsive to temperature changes in the space for controlling the operation of said relay; means for controlling the operation of the secondary heater including a normally closed valve for supplying heating medium thereto, a solenoid for opening the said normally closed valve, a relay for closing a circuit through the solenoid and a thermostat responsive to temperature changes for controlling the operation of this relay; separate auxiliary heaters for said thermostats, means for supplying a predetermined constant energy to the auxiliary heater of the last mentioned thermostat, means for adding temporary energy to each of the said auxiliary heaters alternatively, and means including a third thermostat responsive to a predetermined temperature for adjusting the functional setting of the second thermostat.

6. In combination with a primary heater for directly adding heat to an enclosed space, means for circulating air through the space, and a secondary heater for adding heat to the circulated air; means for controlling the operation of the primary heater including a normally open valve for supplying heating medium thereto, an electrically energized device for closing said valve, a relay for closing a circuit through said device, and a thermostat responsive to temperature changes in the space for controlling the operation of said relay; means for controlling the operation of the secondary heater including a normally closed valve for supplying heating medium thereto, a solenoid for opening the said normally closed valve, a relay for closing a circuit through the solenoid and a thermostat responsive to temperature changes within the space for controlling the operation of this relay; separate auxiliary heaters for said thermostats, means for supplying a predetermined constant energy to the auxiliary heater of the last mentioned thermostat, and means for adding temporary energy to each of the said auxiliary heaters alternatively, comprising energizing circuits therefor connected through the last mentioned relay, whereby auxiliary heat is added to the first mentioned thermostat when the supply valve for the secondary heater is closed and additional auxiliary heat is supplied to the second mentioned thermostat when the supply valve for the secondary heater is open, and means including a third thermostat for opening a circuit through the auxiliary heater for the second mentioned thermostat and thereby adjust the said second thermostat to a higher temperature setting.

7. In combination with means for circulating air through an enclosed space and means for adding heat to the circulated air including a radiator, an electrically actuated valve for supplying heating medium to said radiator, means for controlling the operation of said valve including a thermostat responsive to temperature changes within the space, an auxiliary electric heater for said thermostat and means for supplying energy to said auxiliary heater including a relay and a control thermostat therefor responsive to temperature changes within said space, whereby the relay is actuated upon the functioning of the second mentioned thermostat to open a circuit through said auxiliary heater and thereby adjust the first mentioned thermostat to a higher functional setting.

8. In combination with means for circulating air through an enclosed space, means for cooling the air, and means for adding heat to the circulated air including a radiator, an electrically actuated valve for supplying heating medium to said radiator, means for controlling the operation of said valve including a thermostat responsive to temperature changes within the space, an auxiliary electric heater for said thermostat, a relay and a control thermostat therefor responsive to temperature changes within said space for energizing said air cooling means upon the functioning of the last mentioned thermostat and for opening an energizing circuit through the said auxiliary heater whereby the first mentioned thermostat is adjusted to a higher functional setting.

9. In combination with means for circulating air through an enclosed space, means for cooling the air, and means for adding heat to the circulated air including a radiator, an electrically actuated valve for supplying heating medium to said radiator, means for controlling the operation of said valve including a thermostat responsive to temperature changes within the space, an auxiliary electric heater for said thermostat, a relay and a control thermostat therefor responsive to temperature changes within said space for energizing said air cooling means upon the functioning of the last mentioned thermostat and for opening an energizing circuit through the said auxiliary heater whereby the first mentioned thermostat is adjusted to a higher functional setting and manually operable means for adjusting the functional setting of the last mentioned thermostat.

10. In combination with means for circulating air through an enclosed space, means for cooling the air, and means for adding heat to the circulated air including a radiator, an electrically actuated valve for supplying heating medium to said radiator, means for controlling the operation of said valve including a thermostat responsive to temperature changes within the space, an auxiliary electric heater for said thermostat, a relay and a control thermostat therefor responsive to temperature changes within said space for energizing said air cooling means upon the functioning of the last mentioned thermostat and for opening an energizing circuit through the said auxiliary heater whereby the first mentioned thermostat is adjusted to a higher functional setting, and manually operable means for adjusting the functional setting of both thermostats.

11. In combination with means for circulating air through an enclosed space, means for cooling the air, and means for supplying heat to maintain the space at a desired temperature; means for controlling the operation of the heating means including an electrically actuated valve, a relay for closing a valve energizing circuit, and a thermostat for controlling the operation of the relay; an auxiliary heater for said thermostat; manually operable means for adjustably varying the supply of electric current to said auxiliary heater so as to adjust the functional setting of said thermostat, and an additional circuit connected through said relay for adding additional current to said auxiliary heater when the thermostat calls for heat; a relay for closing a circuit for energizing said cooling means and means defining an electric circuit connected through said last mentioned relay for supplying additional heating current to said auxiliary heater and adapted to be opened when the cooling means is energized so as to increase the functional setting of the first mentioned thermostat.

12. In combination with means for circulating air through an enclosed space, means for cooling the air, and means for supplying heat to maintain the space at a desired temperature; means for controlling the operation of the heating means including an electrically actuated valve, a relay for closing a valve energizing circuit, and a thermostat for controlling the operation of the relay; an auxiliary heater for said thermostat; manually operable means for adjustably varying the supply of electric current to said auxiliary heater so as to adjust the functional setting of said thermostat, and an additional circuit connected through said relay for adding additional current to said auxiliary heater when the thermostat calls for heat; a relay for closing a circuit for energizing said cooling means, a control thermostat therefor; manual means for adjusting the functional setting of this thermostat, and means defining an electric circuit connected through said last mentioned relay for supplying additional heating current to said auxiliary heater of said first mentioned thermostat and adapted to be opened when the cooling means is energized so as to increase the functional setting of the first mentioned thermostat.

13. In combination with a primary heater for adding heat directly to the atmosphere within an enclosed space, means including a relay and a primary control thermostat associated therewith for controlling the operation of said primary heater, an auxiliary electric heater for the primary control thermostat, means for circulating air through said space, a secondary heater for adding heat to the circulated air, means including a second relay and a secondary control thermostat associated therewith for controlling the operation of the secondary heater, an auxiliary electric heater for the secondary control thermostat, an energizing circuit for the auxiliary heater of said primary control thermostat and adapted to be closed when the secondary control thermostat is satisfied, an energizing circuit for the auxiliary heater of the secondary control thermostat connected through said second relay and adapted to be closed when the secondary control thermostat calls for heat, means for cooling the circulated air, means including a third relay and a third thermostat for controlling the operation of the cooling means, and means connected through the third relay for supplying a portion of the auxiliary heat to the secondary control thermostat and adapted to be opened to increase the functional setting of the secondary control thermostat when the cooling means is operating.

14. In combination with a primary heater for heating an enclosed space and means for controlling the operation thereof including a thermostat responsive to temperature changes within the enclosed space and provided with an auxiliary electric heater, means including a duct for delivering air into said space, an air heating element and an air cooling element arranged in said duct so that air will pass through one to the other, means for controlling the heating element including a thermostatically controlled relay for opening and closing an electric circuit through said auxiliary heater, and means for varying the effectiveness of one of said elements comprising a by-pass duct for directing a portion of the air around one of said elements, a valve for opening and closing said by-pass duct, a heat motor responsive to temperature changes for adjusting the position of said valve, and an electric heating element for said motor connected through said relay to receive heat simultaneously with the said auxiliary electric heater for said thermostat.

TIMOTHY J. LEHANE.
EVERETT H. BURGESS.

REFERENCES CITED

The following references are of record in the file of this patent:

UNITED STATES PATENTS

| Number | Name | Date |
|---|---|---|
| 843,909 | Peters et al. | Feb. 12, 1907 |
| 2,181,480 | Gillett et al. | Nov. 28, 1939 |